United States Patent [19]

Ulich et al.

[11] Patent Number: 4,950,878
[45] Date of Patent: Aug. 21, 1990

[54] WAVEFRONT CONTROL SYSTEM USING OPTICAL COARSE/FINE GRADIENT SENSOR

[75] Inventors: Bobby L. Ulich, Tucson, Ariz.; John D. G. Rather, Washington, D.C.; Gregory H. Ames; Albert J. Lazzarini, both of Colorado Springs, Colo.; Edward Conklin, Hermosa Beach, Calif.

[73] Assignee: Kaman Aerospace Corporation, Bloomfield, Conn.

[21] Appl. No.: 336,719

[22] Filed: Apr. 12, 1989

[51] Int. Cl.[5] .............................................. G01J 1/20
[52] U.S. Cl. ................................. 250/201.9; 356/354
[58] Field of Search ...................... 250/201; 356/5, 354

[56] References Cited

U.S. PATENT DOCUMENTS

| | | | |
|---|---|---|---|
| 3,821,545 | 6/1974 | Nakagawa et al. | 250/201 |
| 4,141,652 | 2/1979 | Feinleib | 250/201 |
| 4,518,854 | 5/1985 | Hutchin | 250/201 |
| 4,600,299 | 7/1986 | Abshire | 356/5 |

Primary Examiner—David C. Nelms
Assistant Examiner—Que Tan Le
Attorney, Agent, or Firm—Fishman, Dionne & Cantor

[57] ABSTRACT

An adaptive optics wavefront control system is presented wherein phase errors are reduced to a minimum using a coarse/fine gradient sensor.

6 Claims, 3 Drawing Sheets

WAVEFRONT CONTROL SYSTEM USING OPTICAL COARSE/FINE GRADIENT SENSOR

BACKGROUND OF THE INVENTION:

This invention relates generally to adaptive optics wavefront control systems. More particularly, this invention relates to a new and improved adaptive optics wavefront control system wherein phase errors are reduced to a minimum using a coarse/fine gradient sensor.

Optical wavefront sensors known as Hartmann sensors are well known in the art. An example of a Hartmann wavefront sensor is described in U.S. Pat. No. 4,141,652. This type of sensor is composed of an array of wavefront gradient (tilt) sensors and a reconstructor. The tilt magnitudes in X and Y directions are measured in each of a number of subapertures which are contiguous with no appreciable gaps existing between subapertures. By a process of two dimensional numerical integration, the tilt measurements may be combined to reconstruct a wavefront phase map in which high spatial frequencies are missing because of the smoothing action of averaging tilt over the area of each subaperture.

A diagram of a Hartmann optical wavefront sensor is shown in FIG. 1 at 11. In FIG. 1, the input optical beam 10 is roughly collimated and falls upon a lenslet array 12. The lenslet array is a closely packed, two dimensional array of lenses 14. Each lens 14 focuses a portion of the input beam (called a subaperture) onto a two-dimensional array of position sensitive detectors 16. The detector array 16 can be formed by suitably mounting individual quadrant cell trackers, one for each lenslet (subaperture), or by a monolithic array of photosensitive pixels, such as are available in charge injection devices (CID) or charge coupled device (CCD) detector arrays.

The intensity of light falling on one subunit or pixel of the detector array 16 is read out in the form of an electronic charge or current into a centroid computer 18. After reading out the electronic signals (proportional to the light impinging on each pixel) corresponding to all the pixels in the array of detectors 16 into centroid computer 18, the centroid computer calculates through either analog or digital computing the first moment of the intensity distribution in both X and Y directions for each subaperture. This is the intensity centroid and, if the lenslet arrays have reasonably good optical quality, is proportional to the input wavefront tilt averaged over the subaperture area of each lenslet 14.

A wavefront reconstructor 20 receives the X and Y centroid positions for each subaperture which, when multiplied by a suitable conversion factor, represents the subaperture wavefront tilts. Reconstructor 20 can be analog in operation, such as an array of resistors driven by current sources for each tilt measurement. In this case, the wavefront phases can be recovered at the array of points between the subapertures by measuring the voltages present at the nodes of the resistor array. Another implementation is a digital computer which performs the numerical integration of the tilts by matrix multiplication to produce an array of input phase estimates.

A disadvantage of the two-dimensional detector array 16 is the large number of pixels required to achieve a useful dynamic range of input wavefront deviations from the nominal shape, which is usually taken as planar. That is, at least three, and normally four pixels are required to measure the X and Y centroid coordinates for each subaperture (and therefore the subaperture wavefront tilt). If sufficient sensitivity could be achieved with this minimum number of pixels, then the detector could be read out quickly in series with a fast response time. This is necessary to achieve a large temporal bandwidth when the wavefront sensor is used as part of an adaptive optics wavefront control system.

In known adaptive optics control systems, the input beam is first reflected off an adjustable mirror (such as a deformable mirror with an array of actuators to introduce changes in the shape of the mirror reflecting surface) and then fed into the wavefront sensor 11. A closed-loop servo control system with negative feedback is used to control the reflection angle off each subaperture's part of the input optical beam so as to minimize the deviations of each centroid from its nominal position on the array detector 16. Such a closed-loop system for controlling the adaptive optics control loops is shown in FIG. 2.

In FIG. 2, the input optical beam 22 is reflected off deformable mirror 24 whose shape is controlled by piston actuators 26. Next, the light beam is passed through a high-quality beam splitter 28 with negligible optical aberrations. A first portion 30 of the light is reflected by beam splitter 28 to form the compensated output optical beam 30. A second portion 32 of the light reflected by deformable mirror 24 is transmitted by beam splitter 28 to wavefront sensor 11 (which is the device shown in FIG. 1). The reconstructed wavefront phase deviations from the desired (planar) shape serve as error signals to identical negative-feedback servo control loops, one for each phase measurement point and its corresponding piston actuator 26 in the deformable mirror assembly. The servo electronics 33 receive the wavefront phase error signals, process them by multiplication and normally by integration and frequency-dependent filtering to achieve high gain and freedom from undesirable oscillations. Servo electronics 33 also drive the actuators 26 in the direction to reduce the wavefront phase errors. It will be appreciated that under steady state conditions, the surface of deformable mirror 24 is driven to the conjugate of the input beam wavefront shape so that upon reflection, the light is equiphase across the beam both going onto the wavefront sensor 11 and also at the beam control system output 30.

As previously mentioned, the spatial dynamic range and sensitivity of the subaperture centroid detectors 16 may not be sufficient to meet two fundamental requirements for the beam control system of FIG. 2 to operate properly. First, the centroid trackers must have sufficiently large dynamic range such that, when the system is first activated, an unambigous measurement of each centroid position of each lenslet spot 14 is obtained. If the input beam has large subaperture tilts, the spots may overlap or appear so far from their nominal positions that either it is impossible to tell which spot belongs to which subaperture (in the case of a CID/CCD array); or the spot misses the detector altogether and no centroid determination is possible. On the other hand, if a very large tilt dynamic range is achieved by, for example, using a lenslet 14 with a very short focal length, then noise sources such as shot noise, dark current, nonlinearity, charge transfer inefficiency, quantization, etc. will limit the precision with which the centroid can be determined even near the null operating point. In this case, the closed-loop operation may be limited by the lack of sensitivity, with the result being that the output beam has wavefront deviations due to noise sources internal to the wavefront sensor 11 which are clearly undesirable.

For a closed-loop beam control system such as is shown in FIG. 2, the large capture range and the high sensitivity required in the subaperture tilt sensor can be achieved in several ways. One method is to use a larger number of pixels, arranged so that the spot diameter is larger than one pixel. This allows centroid determination to a small fraction of a pixel size. Using many such pixels (for example, an 8×8 array) will allow a large dynamic capture range for each spot without confusion. However, this method inevitably results in a reduced temporal bandwidth since many more pixels must now be read out which takes a correspondingly longer time period. Alternatively, many fewer subapertures could be sensed in the same time, but again this is highly undesirable since higher spatial frequency information about the wavefront shape will be lost. Thus, one must give up either high temporal or high spatial frequency information with this method if the readout rate of array detectors is assumed to be constant.

SUMMARY OF THE INVENTION

The above-discussed and other problems and deficiencies of the prior art are overcome or alleviated by the adaptive optics wavefront control system of the present invention. In accordance with the present invention, it is not necessary to precisely measure the wavefront in the open-loop condition just before closing the loops. Instead, only coarse information is sufficient to begin adjusting the actuators in the proper direction to assure that the phase errors will be reduced toward the desired null operating point. Then, at a later time, when the phase errors are approximately zero, a second, more precise centroid measurement is taken to minimize the wavefront error. Simplification and performance improvements result from relaxing the two wavefront gradient sensor requirements so that they do not have to be met simultaneously. Strictly speaking, wavefront sensors in accordance with the prior art must have dynamic range and sensitivity simultaneously. However, when applied to a closed-loop beam control system with adaptive optics, high sensitivity is not required when the wavefront errors are large. High sensitivity, resulting in precise wavefront phase error determinations, is only required after the control loop is closed and the errors are reduced to a relatively small value (i.e., near the null operating point).

The above-discussed and other features and advantages of the present invention will be appreciated and understood by those of ordinary skill in the art from the following detailed description and drawings.

BRIEF DESCRIPTION OF THE DRAWINGS:

Referring now to the drawings, wherein like elements are numbered alike in the several FIGURES.

Figure 1:
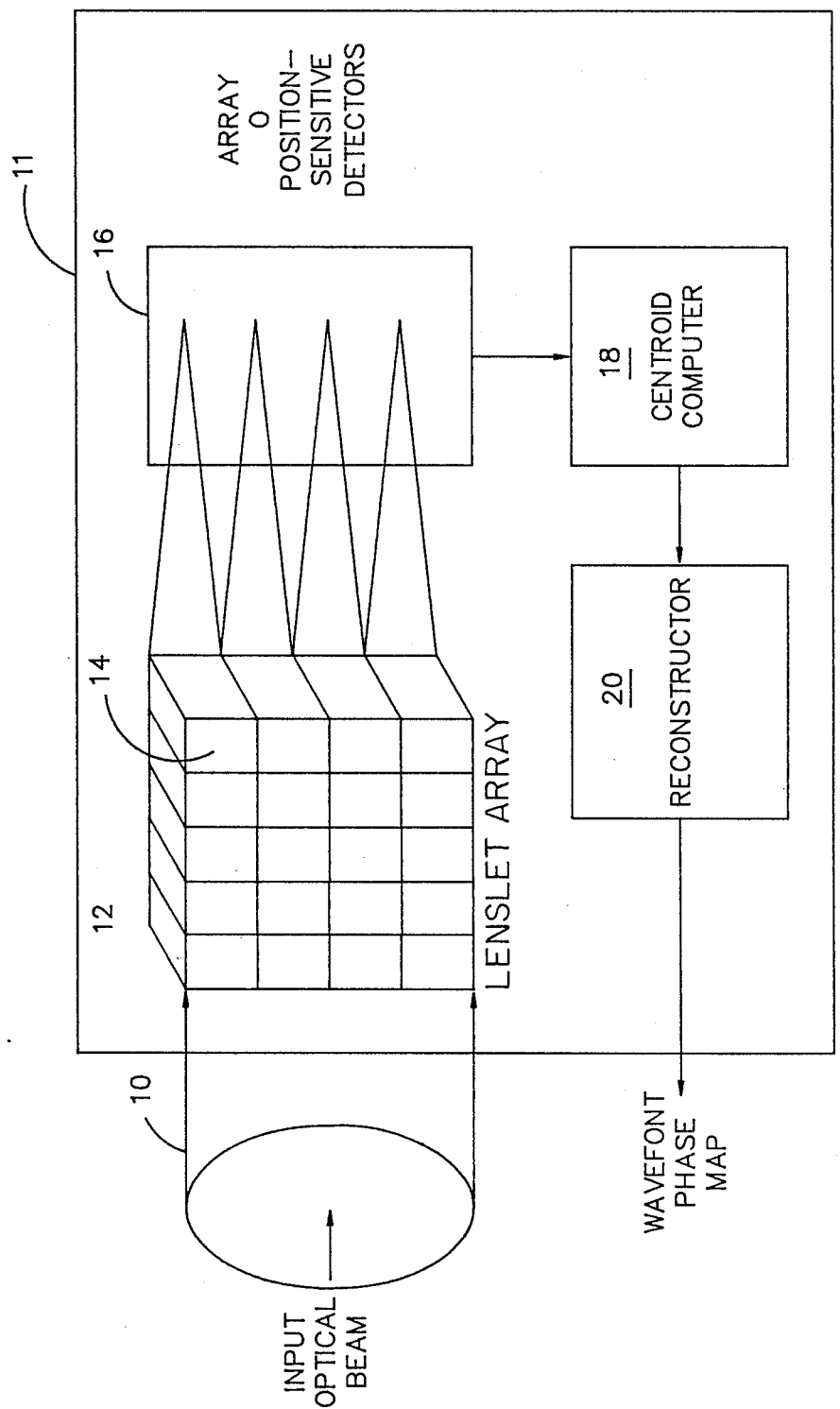
FIG. 1 is a schematic of a prior art Hartmann wavefront sensor.
Figure 2:
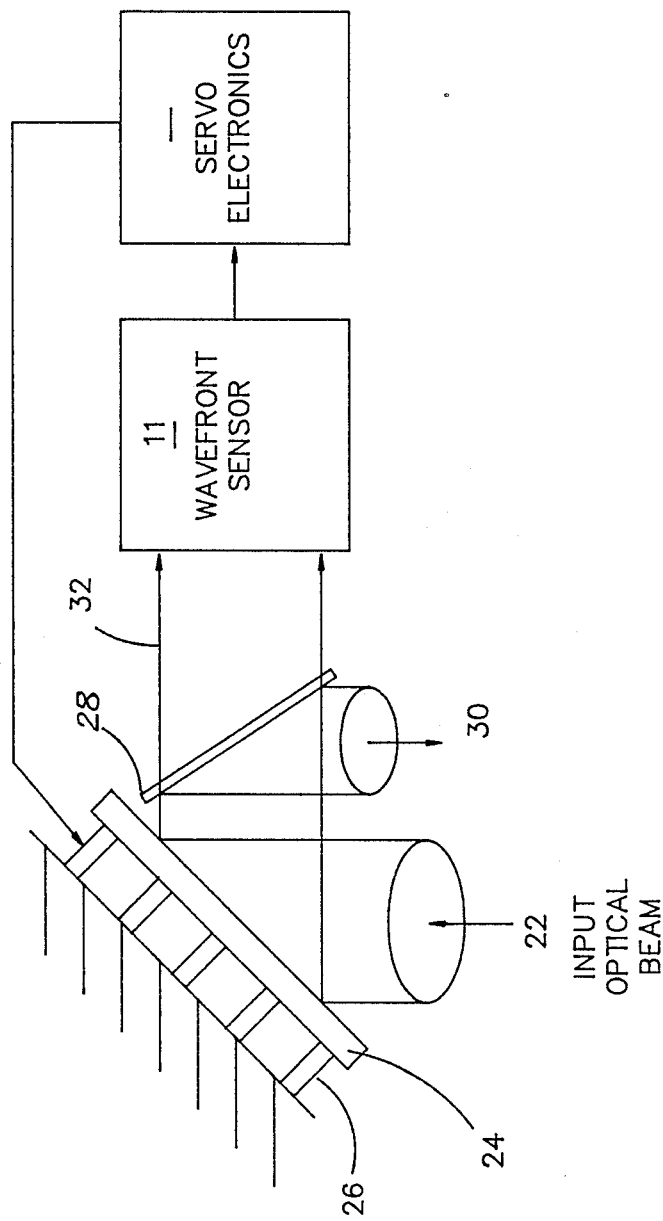
FIG. 2 is a schematic of an adaptive optics wavefront control system.
Figure 3:
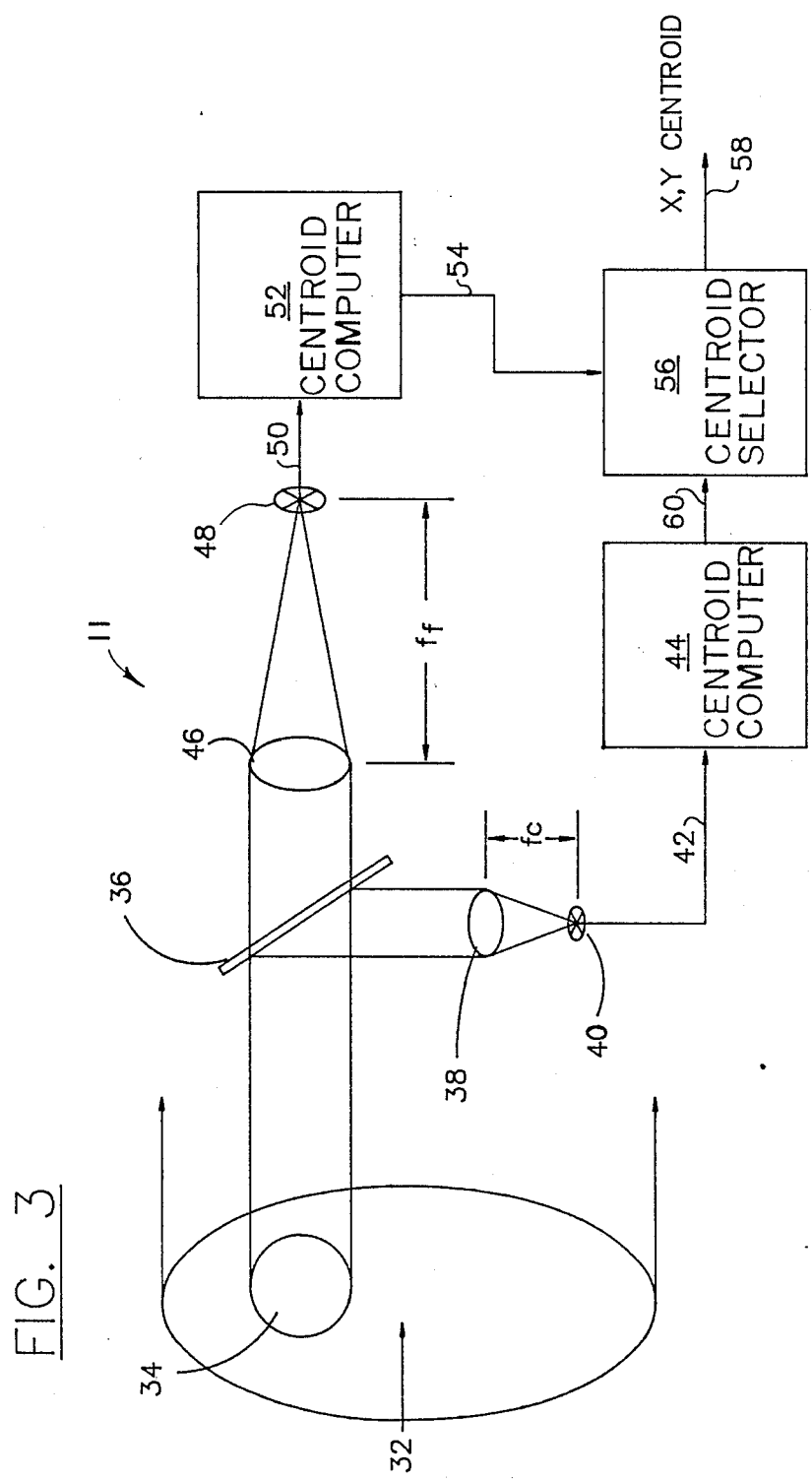
FIG. 3 is a schematic view showing one subaperture component of a coarse/fine gradient sensor in accordance with the present invention.

DESCRIPTION OF THE PREFERRED EMBODIMENT:

In accordance with a preferred embodiment of the present invention, the optical wavefront sensor control comprises what is termed a coarse/fine gradient sensor, one subaperture of which is shown in FIG. 3. The input optical beam 32 is subdivided into ray bundles for each subaperture 34 and is passed to a beam splitter 36. Upon reflection, part of the light is focused by lenslet 38 with focal length $f_c$ upon photosensitive quadrant cell 40 producing electronic signals 42 used by a centroid computer 44 to calculate the X and Y coarse centroid position. The other part of the subaperture light beam passing through beam splitter 36 is focused by lenslet 46 of focal length $f_f$ to produce a spot on quadrant cell 48 producing electronic signals 50 used by the centroid computer 52 to calculate the X and Y fine centroid position 54. The centroid selector 56 selects as its output 58 the coarse centroid 60 when the radial coarse centroid error is above a threshold value P. The centroid selector 56 selects the fine centroid 54 as its output 58 when the coarse centroid 60 is below the radial threshold value P.

The focal length $f_f$ is chosen to be much longer than $f_c$ in FIG. 3 so that the linear motion of the light spot on the quadrant cell is much greater for the fine channel (46, 48) than for the coarse channel (38, 40) given the same subaperture tilt of the input beamlet 34. Thus, the fine channel will have higher sensitivity but smaller dynamic range than the coarse channel.

During operation, the coarse channel quadrant cell dimensions and focal length $f_c$ are selected to provide sufficient tilt dynamic range for unambiguous tilt measurement, even if the quadrant cells are close together for neighboring subapertures. In the limit, adjacent blocks of four (4) pixels in a CID/CCD array may be used for the coarse channel sensing, and either another part of the same monolithic chip detector array or a second detector array could be used for the fine sensors.

The minimum practical number of pixels required for each subaperture of the coarse/fine wavefront sensor of the present invention is thus 8 (4 for coarse and 4 for fine). If each (synthesized) quadrant cell can be read out with sufficient precision to achieve a resolution of one part in R of the capture (maximum) centroid range, than the combined coarse/fine ranges multiply to produce a combined ratio of dynamic range to resolution of $R^2$. In this case, the ratio cf fine to coarse lenslet focal length is $f_f/f_c=R$. If each quadrant cell can be used to determine the centroid to B binary bits of precision (where B is approximately equal to $\log_2 R$), then the coarse/fine combination has a precision of 2B binary bits [$=\log_2(R^2)$]. This is a much more efficient usage of pixels than can be achieved by grouping more than four into a single centroid sensor. For instance, with 8 pixels rather than 4, dynamic range is only increased in each dimension by roughly $(8/4)^{\frac{1}{2}}=(2)^{\frac{1}{2}}$. Thus, increasing the number of pixels used in a single centroid sensor only increases the relative precision by the square root of the ratio of the numbers of pixels. By creating new centroid sensors, the improvement in relative precision is much greater if successively greater sensitivities are used for each centroid sensor.

As mentioned, a longer focal length lenslet may be used to increase the sensitivity of the fine sensor. This could be accomplished in other ways such as using a smaller diameter pixel sensor and a correspondingly smaller beamlet spot size.

The minimum spot size S for a collimated input beam generated by a distant point source is $$S = 2.44 \lambda f/d \quad (1)$$

where $\lambda$ is the wavelength, d is the lenslet aperture, and f is the lenslet focal length. For spatially extended sources of the input beam, it may be desirable to spatially place the photosensitive detector away from the lens focus so as to produce a larger, defocussed spot. By doing this, the size of the spot depends less on the angular size of the light source and therefore, the calibration of the centroid detector will suffer smaller errors due to variable source size.

While preferred embodiments have been shown and described, various modifications and substitutions may be made thereto without departing from the spirit and scope of the invention. Accordingly, it is to be understood that the present invention has been described by way of illustrations and not limitation.

What is claimed is:

1. A coarse/fine wavefront sensor comprising:
    a plurality of subapertures;
    a beam splitter associated with each of said subapertures, said beam splitter being adapted to reflect a portion of an optical input beam and to transmit a portion of an optical input beam;
    a first lenslet for focussing a reflected input beam from said beam splitter with focal length fc;
    a first photsensitive quadrant cell for receiving a focused input beam from said first lenslet and producing a first electronic signal;
    first centroid computer means for receiving said first electronic signal and calculating a coarse centroid position;
    a second lenslet for focussing an input beam transmitted through said beam splitter with focal length $f_f$;
    a second photosensitive quandrant cell for receiving a focussed input beam from said second lenslet and producing a second electronic signal;
    second centroid computer means for receiving said second electronic signal and calculating a fine centroid position; and
    centroid selector means communicating with said first and second centroid computer means, said centroid selector means selecting as its output said coarse centroid position when the radial coarse centroid error is above a predetermined threshold value P, and said centroid is selector means selecting as its output said fine centroid position when the radial coarse centroid error is below said threshold value P.

2. The sensor of claim 1 wherein:
    said focal length $f_f$ is larger than said focal length $f_c$.

3. The sensor of claim 1 wherein:
    each subaperture includes at least 8 pixels.

4. A wavefront control method using an optical coarse/fine gradient sensor comprising the steps of:
    delivering an optical input beam to a beam splitter associated with one of a plurality of subapertures, said beam splitter reflecting a portion of said optical input beam and transmitting a portion of said optical input beam;
    positioning a first lenslet for focussing the reflected input beam from said beam splitter with focal length fc;
    positioning a first photsensitive quadrant cell for receiving the focused input beam from said first lenslet and producing a first electronic signal;
    positioning a first centroid computer means for receiving said first electronic signal and calculating a coarse centroid position;
    positioning a second lenslet for focussing the input beam transmitted through said beam splitter with focal length $f_f$;
    positioning a second photosensitive quadrant cell for receiving the focussed input beam from said second lenslet and producing a second electronic signal;
    positioning a second centroid computer means for receiving said second electronic signal and calculating a fine centroid position; and
    positioning a centroid selector means for communicating with said first and second centroid computer means, said centroid selector means selecting as its output said coarse centroid position when the radial coarse centroid error is above a predetermined threshold value P, and said centroid selector means selecting as its output said fine centroid position when the radial coarse centroid error is below said threshold value P.

5. The method of claim 4 wherein:
    said focal length $f_f$ is larger than said focal length $f_c$.

6. The method of claim 4 wherein:
    each subaperture includes at least 8 pixels.

* * * * *